(12) United States Patent
Shibutani et al.

(10) Patent No.: US 12,012,271 B2
(45) Date of Patent: Jun. 18, 2024

(54) SHEET MATERIAL CONTAINER

(71) Applicant: Kao Corporation, Tokyo (JP)

(72) Inventors: Ryo Shibutani, Tokyo (JP); Yoshinori Inagawa, Tokyo (JP); Daisuke Kodama, Tokyo (JP); Takahiro Otsuka, Tokyo (JP)

(73) Assignee: Kao Corporation, Tokyo (JP)

( * ) Notice: Subject to any disclaimer, the term of this patent is extended or adjusted under 35 U.S.C. 154(b) by 481 days.

(21) Appl. No.: 17/296,899

(22) PCT Filed: Nov. 20, 2019

(86) PCT No.: PCT/JP2019/045491
§ 371 (c)(1),
(2) Date: May 25, 2021

(87) PCT Pub. No.: WO2020/110865
PCT Pub. Date: Jun. 4, 2020

(65) Prior Publication Data
US 2022/0033161 A1   Feb. 3, 2022

(30) Foreign Application Priority Data

Nov. 26, 2018 (JP) ................................ 2018-220380

(51) Int. Cl.
*B65D 75/58* (2006.01)
*B65D 33/00* (2006.01)
*B65D 75/00* (2006.01)

(52) U.S. Cl.
CPC ......... *B65D 75/5883* (2013.01); *B65D 33/00* (2013.01); *B65D 75/008* (2013.01); *B65D 2203/12* (2013.01)

(58) Field of Classification Search
CPC ..... B32B 2439/00; B32B 3/04; B32B 27/281; B32B 2250/04; B32B 2307/51;
(Continued)

(56) References Cited

U.S. PATENT DOCUMENTS 5,788,121 A * 8/1998 Sasaki ................. B65D 77/065
222/105
11,059,626 B2 * 7/2021 Inagawa .............. B65D 75/008
(Continued)

FOREIGN PATENT DOCUMENTS

CN 102337087 A 2/2012
JP 6-56170 A 3/1994
(Continued)

OTHER PUBLICATIONS

Japanese Office Action dated Mar. 14, 2023 in Japanese Application 2020-168387, (with unedited computer-generated English translation), 4 pages.
(Continued)

*Primary Examiner* — Donnell A Long
(74) *Attorney, Agent, or Firm* — Oblon, McClelland, Maier & Neustadt, L.L.P.

(57) ABSTRACT

A sheet material container includes a container body that surrounds a containing portion for accommodating a content. The container body is formed of a container body-forming sheet member formed by layering a plurality of base material films. The container body-forming sheet member includes the plurality of base material films, an attaching layer by which the base material films are attached to each other, and a filler enclosed portion that is formed between the plurality of base material films and into which a filler is to be filled. The plurality of base material films are made from the same type of resins.

17 Claims, 12 Drawing Sheets

(58) Field of Classification Search
CPC .......... B32B 2307/732; B32B 2439/70; B32B 2553/00; B32B 3/08; B32B 27/28; B32B 27/302; B32B 27/306; B32B 27/308; B32B 2255/10; B32B 2264/102; B32B 2307/75; B32B 7/12; B32B 27/32; B32B 27/34; B32B 3/02; B32B 2250/05; B32B 2250/24; B32B 2307/31; B32B 3/266; B32B 2255/205; B32B 7/02; B32B 7/027; B32B 27/08; B32B 27/20; B32B 27/304; B32B 27/36; B32B 27/365; B32B 2264/101; B32B 2264/104; B32B 2270/00; B65D 31/02; B65D 75/5883; B65D 33/00; B65D 75/008; B65D 2203/12; Y02W 30/80
See application file for complete search history.

(56) References Cited

U.S. PATENT DOCUMENTS

| | | | |
|---|---|---|---|
| 11,148,387 B2* | 10/2021 | Takano | B65D 75/52 |
| 2015/0036950 A1* | 2/2015 | Stanley | B31B 70/00 |
| | | | 383/104 |
| 2017/0313462 A1 | 11/2017 | Taruno et al. | |
| 2018/0236741 A1* | 8/2018 | Hargett | B31B 70/146 |
| 2019/0168941 A1 | 6/2019 | Otsuka et al. | |
| 2019/0185213 A1 | 6/2019 | Kodama et al. | |
| 2019/0248546 A1 | 8/2019 | Inagawa et al. | |
| 2020/0407120 A1 | 12/2020 | Shibutani et al. | |

FOREIGN PATENT DOCUMENTS

| | | |
|---|---|---|
| JP | 2004-256120 A | 9/2004 |
| JP | 2014-125226 A | 7/2014 |
| JP | 2015-101057 A | 6/2015 |
| JP | 2015-522442 A | 8/2015 |
| JP | 2016-74466 A | 5/2016 |
| JP | 2017-141063 A | 8/2017 |
| JP | 2018-108655 A | 7/2018 |
| JP | 2018-144363 A | 9/2018 |
| JP | 2018-144856 A | 9/2018 |
| JP | 2018-144885 A | 9/2018 |
| JP | 2018-144886 A | 9/2018 |
| JP | 2018-144888 A | 9/2018 |
| JP | 2020-63064 A | 4/2020 |
| WO | WO 2013/169688 A1 | 11/2013 |
| WO | WO 2018/202479 A1 | 11/2018 |

OTHER PUBLICATIONS

Combined Chinese Office Action and Search Report dated Oct. 19, 2022 in Chinese Patent Application No. 201980077730.2 (with English translation of office action only), 9 pages.
International Search Report dated Jan. 7, 2020 in PCT/JP2019/045491 filed on Nov. 20, 2019, 2 pages.
Japanese Office Action dated Jun. 17, 2020 in Japanese Patent Application No. 2020-517598 filed on Nov. 20, 2019, 13 pages (with unedited computer-generated English translation).

* cited by examiner

SHEET MATERIAL CONTAINER

TECHNICAL FIELD

The present invention relates to a sheet material container.

BACKGROUND ART

As disclosed in Patent Document 1, for example, there is known a flexible container (sheet material container) made from a flexible material. The flexible material disclosed in Patent Document 1 includes a first laminate, a second laminate, and a seal by which the first laminate and the second laminate are partially attached. That is, the flexible material has a laminate structure. A structural support volume is defined in part between the first laminate and the second laminate, and a structural support frame is formed by filling the structural support volume with an expansion material such as air. The structure of the sheet material container is supported by this structural support frame. Thus, the thickness of the flexible material can be reduced. Therefore, waste can be reduced.

CITATION LIST

PATENT DOCUMENT 1: Japanese Patent Application (Translation of PCT Application) Laid-open No. 2015-522442

SUMMARY OF THE INVENTION

According to one aspect of the present invention, there is provided a sheet material container includes a container body that surrounds a containing portion for accommodating a content. The container body is formed of a container body-forming sheet member formed by layering a plurality of base material films. The container body-forming sheet member includes the plurality of base material films, an attaching layer by which the base material films are attached to each other, and a filler enclosed portion that is formed between the plurality of base material films and into which a filler is to be filled. The plurality of base material films are made from the same type of resins.

DESCRIPTION OF EMBODIMENTS

Figure 1:
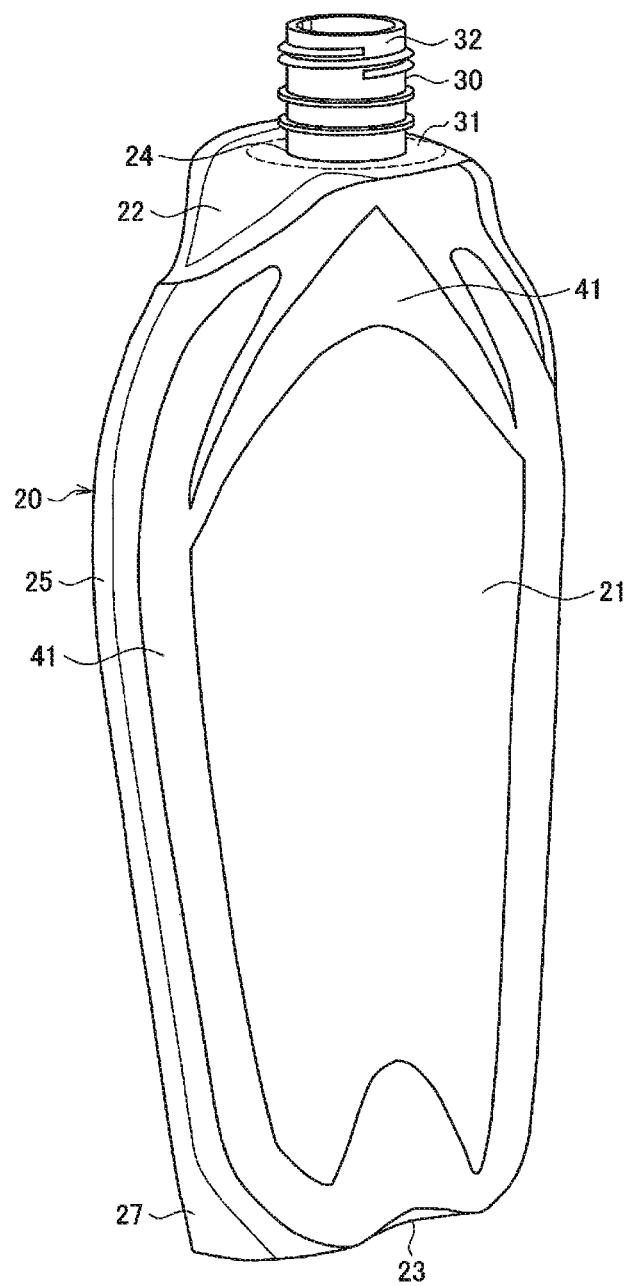
FIG. 1 is a perspective view illustrating an example of a sheet material container according to the present embodiment.

There is a need for further improvement in environmental characteristics of not only the sheet material container disclosed in Patent Document 1, but also various sheet material containers. As described above, the sheet material container disclosed in Patent Document 1 enables a reduction of waste, resulting in excellent in environmental characteristics. However, there has been a room for further improvement in the environmental characteristics, in particular from the standpoint of recycling.

The present invention relates to a sheet material container capable of improving recyclability while maintaining a function of the sheet material container.

As described above, the present invention enables improvement in the recyclability while maintaining the function of the sheet material container.

Hereinafter, preferred embodiments of the present invention will be described in detail, referring to the accompanying drawings. In the present specification and the accompanying drawings, constituent elements having substantially the same functional configuration are denoted by the same reference characters, and the duplicate description thereof will not be repeated.

<1. Configuration and Manufacturing Method of Sheet Material Container>

(1-1. Overall Configuration)

An overall configuration of a sheet material container 100 according to the present embodiment will be described based on FIGS. 1 to 9. The configuration disclosed in Japanese Patent No. 6193535, for example, can be adopted as a configuration of the sheet material container 100 according to the present embodiment. Specifically, as illustrated in FIGS. 1 to 4, the sheet material container 100 includes an inner container 10 that accommodates a content 96 and has an opening 14 through which the content 96 can be discharged, a container body 20 that is formed of a container body-forming sheet member 120 in which a plurality of film layers 121 and 122 are layered and that covers (surrounds) the inner container 10, and an outer air introducing part 26 through which outer air is introduced between an outer surface of the inner container 10 and an inner surface of the container body 20.

In the sheet material container 100, the container body 20 has a bottom gusset 23, and is designed in a self-standing form. Of course, the sheet material container 100 is not limited to the self-standing form, but may be a form (pillow type) intended for use while being laid down, rather than being stood alone.

The inner container 10 is configured to accommodate the content 96 and discharge the content 96 from the opening 14 (more specifically, a spout 30 provided in the opening 14). The content 96 may be of any type. Examples of the content 96 include not only shampoo, hair rinse, body soap, detergent, softener, beverage and food, but also engine oil and chemicals. The content 96 may be liquid (including paste), or may be solid (for example, particle (including granule), or powder).

Figure 2:
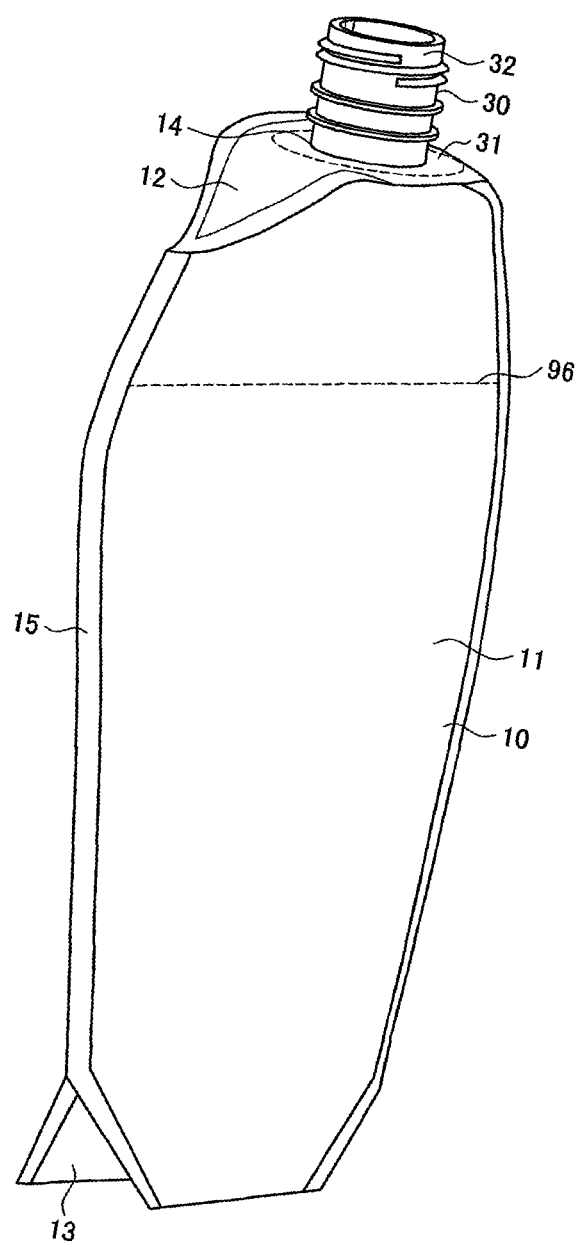
FIG. 2 is a perspective view illustrating an example of an inner container according to the present embodiment.
Figure 3:
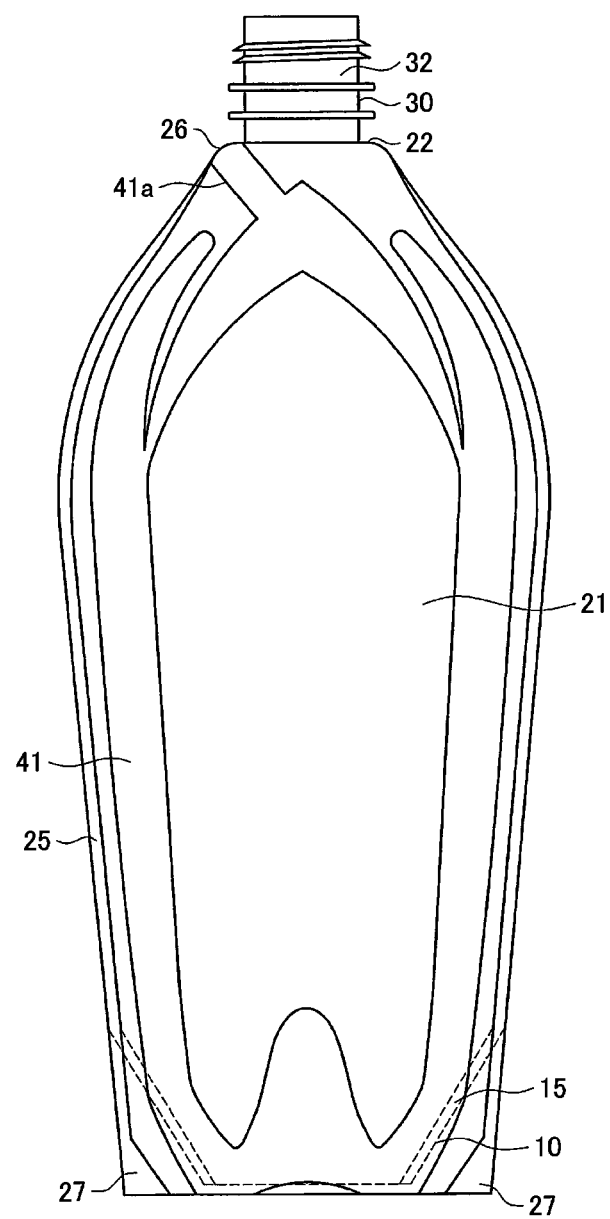
FIG. 3 is a rear view illustrating an example of the sheet material container.

The container body 20 covers the entirety of the inner container 10 illustrated in FIG. 2, to form the outer surface of the sheet material container 100. However, it is only required that the container body 20 covers at least a portion of the inner container 10.

Figure 9:
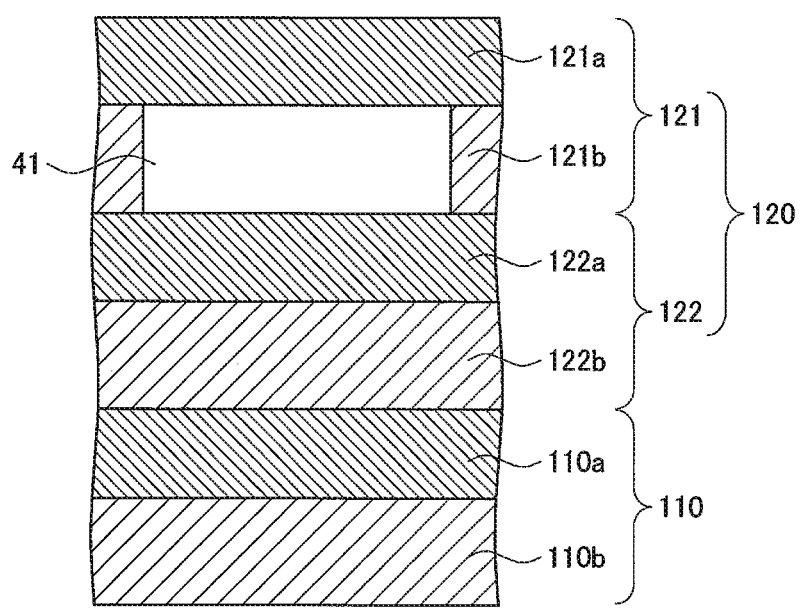
FIG. 9 is a cross-sectional view illustrating an example of a layer configuration of the cover-forming sheet member and the inner container-forming sheet member according to the present embodiment.

The container body-forming sheet member 120 includes a film region in which the plurality of film layers 121 and 122 are attached to each other. As illustrated in FIG. 9, the film layer 121 includes a base material film 121*a*, and an attaching layer 121*b*, and the film layer 122 includes a base material film 122*a*, and an attaching layer 122*b*. Accordingly, it can be also said that the container body-forming sheet member 120 has a structure in which a plurality of base material films 121*a* and 122*a* are layered. A filler enclosed portion 41 into which a filler is to be filled is formed between the base material films 121*a* and 122*a*. A detailed layer configuration of the film layers 121 and 122 will be described later.

The filler enclosed portion 41 is formed continuously along peripheral edges of the container body 20. When the filler is filled into the filler enclosed portion 41, the rigidity as the sheet material container 100 is provided to the container body 20. That is, high self-standing property and high compression strength are provided to the container body 20. As a user discharges the content 96, the inner container 10 contracts, but the container body 20 retains its shape. After fully consuming the content 96, the user discharges the filler from the filler enclosed portion 41. This causes the container body 20 to lose rigidity, whereby the user can easily flatten and fold the sheet material container 100 into a compact size. As a result, it is possible to expect the reduction of waste, and thus the reduction of environmental loads. Furthermore, the outer air introducing part 26 is formed in the sheet material container 100, whereby the capacity of the inner container 10 can be easily reduced independently of the container body 20. In this way, the content 96 in the inner container 10 can be easily discharged, and the content 96 can be prevented from remaining in the inner container 10.

As described above, the filler enclosed portion 41 is formed continuously along the peripheral edges of the container body 20. However, the container body-forming sheet member 120 may include a plurality of filler enclosed portions independent from one another. Besides the filler enclosed portion 41 and the film region, the container body-forming sheet member 120 may include an area where the plurality of film layers 121 and 122 are not attached to each other and that has no filler between the plurality of film layers.

Figure 7:
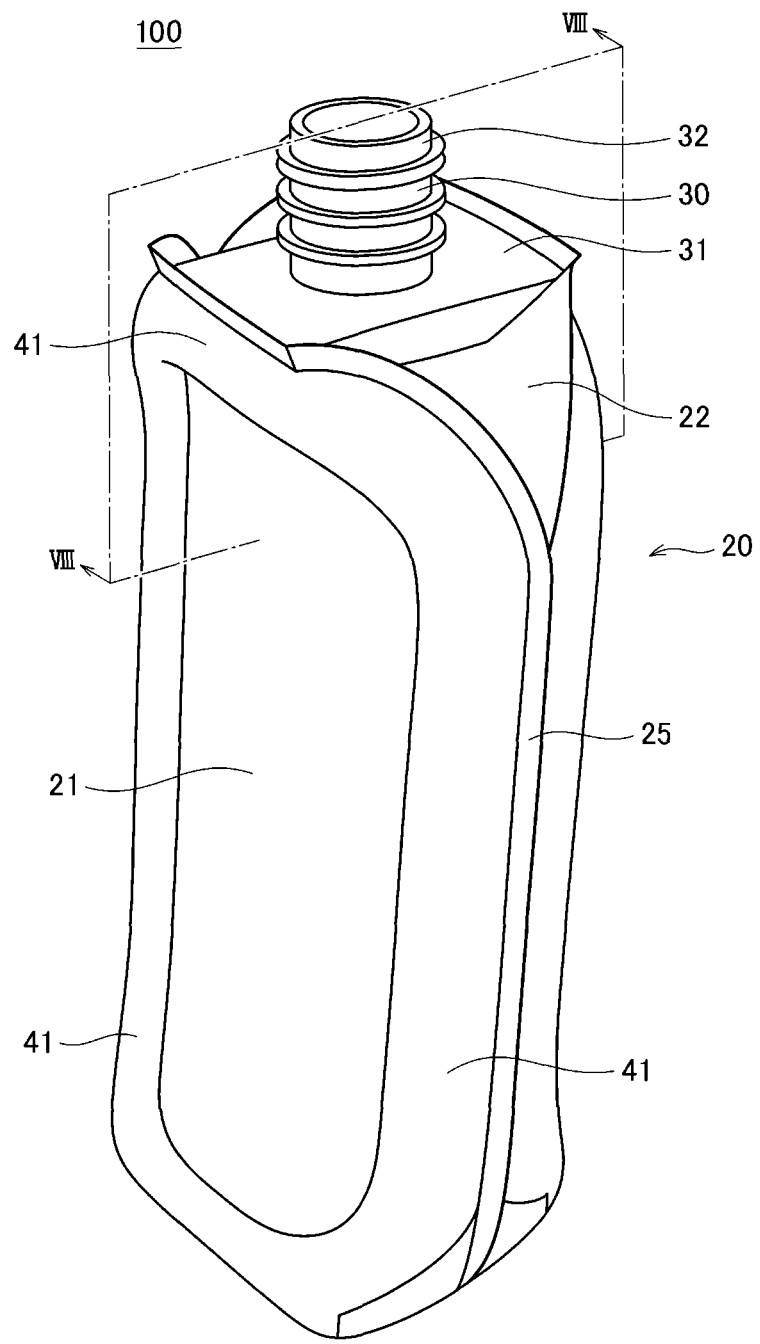
FIG. 7 is a perspective view illustrating another example of the sheet material container according to the present embodiment.

It is more preferable that the filler enclosed portion 41 includes configurations extending in an up-down direction of the container body 20 as illustrated in both edge portions in a width direction of the container body 20 in the sheet material container 100 having a bottom illustrated in each of FIGS. 1 and 7, because the container rigidity can be increased to the degree that the function as the container can be sufficiently maintained even at the time of pumping. As used herein, the term "up-down direction" in the present embodiment refers to a direction in which the opening 14 and the bottom (an end opposite to the opening 14) are connected. The term "width direction" refers to a direction orthogonal to the above-described up-down direction and a base material film layer stack direction, and is a short-side direction of the container body 20 in the embodiment of FIGS. 1 and 7. To further increase the container rigidity, at least one pair of (at least one pair of left and right) filler enclosed portions 41 extending in the up-down direction may be provided along both edge portions in the width direction of the container body 20 on each side of opposite sides across the containing portion of the container body 20 in the base material film layer stack direction.

The outer air introducing part 26 is formed in a boundary portion between a trunk 21 and a top gusset 22 of the container body 20. For example, the outer air introducing part 26 is formed so that an inner container-forming sheet member 110 and the container body-forming sheet member 120 are not attached to each other in this portion, whereby the outer air introducing part 26 is formed. However, the outer air introducing part 26 may be solely owned by the container body 20. In this case, the outer air introducing part 26 may be, for example, an opening formed in the container body 20. Additionally, the sheet material container 100 may include a plurality of outer air introducing parts 26.

(1-2. Configuration of Inner Container)

As illustrated in FIG. 2, the inner container 10 includes a top gusset 12 that is formed at an upper end of the inner container 10, a bottom gusset 13 that is formed at a bottom of the inner container 10, and a trunk 11 which is a portion between the top gusset 12 and the bottom gusset 13. An inner space of the inner container 10 serves as the containing portion that accommodates the content 96.

Figure 5:
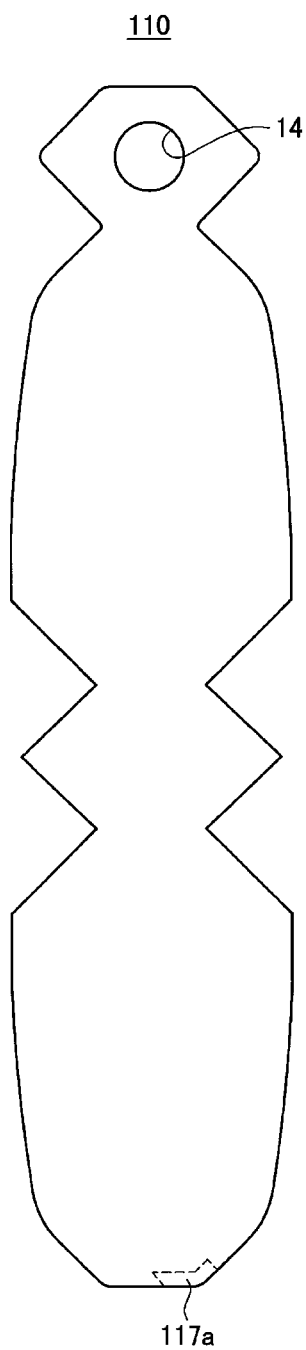
FIG. 5 is a plan view illustrating an example of an inner container-forming sheet member.

The inner container 10 is formed into a shape as illustrated in FIG. 2, by folding the inner container-forming sheet member 110 illustrated in FIG. 5 and by attaching peripheral edge portions of the folded inner container-forming sheet member 110 to each other (for example, by heat sealing). Of course, the inner container 10 is not always necessarily formed of the sheet member, but may be formed by blow molding, for example.

The top gusset 12 has the opening 14 through which the content 96 in the containing portion can be discharged to outside. The top gusset 12 is provided with a cylinder part 32 of the spout 30 adapted to extend through the opening 14, for example. Accordingly, the content 96 is discharged to outside through the spout 30 extending through the opening 14. The bottom gusset 13 is formed at the end opposite to the opening 14 in the inner container 10. The peripheral edge portion of the inner container 10 forms a sealed part 15 by attaching the peripheral edge portions of the inner container-forming sheet member 110 to each other.

(1-3. Configuration of Container Body 20)

Figure 6:
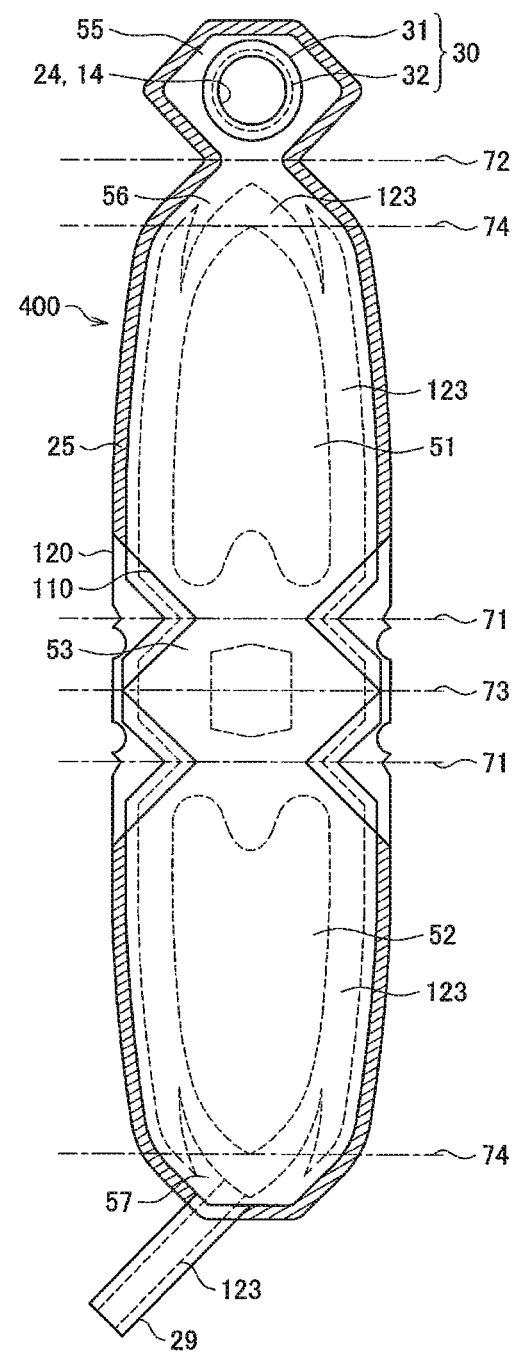
FIG. 6 is a plan view illustrating an example of a container forming sheet.

The container body 20 is formed into a shape as illustrated in FIG. 1, for example, by folding a container forming sheet 400 illustrated in FIG. 6 (a sheet member formed by layering and attaching the inner container-forming sheet member 110 and the container body-forming sheet member 120) and by attaching the peripheral edge portions of the folded container body-forming sheet member 120 to each other or the peripheral edge portions of the folded inner container-forming sheet member 110 to each other.

The container body 20 includes the top gusset 22 that is formed at an upper end of the container body 20, a bottom gusset 23 that is formed at a bottom of the container body 20, and the trunk 21 which is a portion between the top gusset 22 and the bottom gusset 23. The bottom gusset 23 covers a lower face side of the bottom gusset 13, and is a portion that faces a placement surface when the sheet material container 100 is placed thereon in a self-standing manner. The top gusset 22 covers an upper face side of the top gusset 12, and has an opening 24 through which the content 96 in the containing portion of the inner container 10 can be discharged. As described later, the top gusset 22 is provided with the cylinder part 32 of the spout 30 adapted to extend through the opening 24. The trunk 21 surrounds the trunk 11.

The peripheral edge portion of the container body 20 forms sealed parts 25 and 27. In the sealed part 25, the peripheral edge portions of the container body-forming sheet member 120 and the peripheral edge portions of the inner container-forming sheet member 110 are attached to each other. That is, the top gussets 12 and 22 are connected to each other, and the trunks 11 and 21 are connected to each other. Additionally, in the sealed part 25, the peripheral edge portions of the inner container-forming sheet member 110 are attached to each other. Furthermore, in the sealed part 27, the peripheral edge portions of the container body-forming sheet member 120 are attached to each other. Thereby, the container body 20 is formed into a container shape covering the entirety of the inner container 10. The sheet material container 100 is configured to be capable of self-standing, when the bottom gusset 23 is placed on a horizontal placement surface.

In this way, the container body 20 and the inner container 10 are partially attached to each other. Since the inner container 10 is thus held by the container body 20, the inner container 10 can be prevented from creasing even if the inner container 10 is made thin, and the inner container 10 is more easily collapsed flatly. Hence, the content 96 can be prevented from remaining in the inner container 10.

However, the container body 20 and the inner container 10 are not necessarily attached over the entire range (the container body 20 and the inner container 10 are not attached at all). Even in this case, it is preferable that the inner container 10 is held inside the container body 20 by the container body 20. For example, a configuration may be adopted in which the edge portions of the inner container-forming sheet member 110 are attached to each other by outer edge portions of the sealed part 25, and the sealed part 15 is sandwiched between inner edge portions of the sealed part 25.

The spout 30 includes a flat plate-shaped base part 31 that is attached to the inner surface side of the inner container 10, and the cylinder part 32 that protrudes outside from the base part 31 through the opening 14 of the inner container 10 and the opening 24 of the container body 20. An outer peripheral surface of the cylinder part 32 is threaded so that a pumping cap or a cap with a check valve can be installed to the spout 30. It is preferable that the base part 31 of the spout 30 is attached to the sheet member of the top gusset 12 formed at the upper end of the inner container 10. Furthermore, the base part 31 of the spout 30 may be configured to be attached to the sheet member of the top gusset 22 formed at the upper end of the container body 20.

The filler enclosed portion 41 is formed continuously along the peripheral edge portion of the container body 20, and the inside of the filler enclosed portion 41 is filled with the filler. Hereby, the rigidity as the sheet material container 100 can be provided to the container body 20. A part of the filler enclosed portion 41 extends toward the peripheral edge portion of the container body 20 in the vicinity of the top gusset 22. This part is a portion that is connected to a filler introducing part 29 when the filler is filled into the filler enclosed portion 41.

Figure 8:
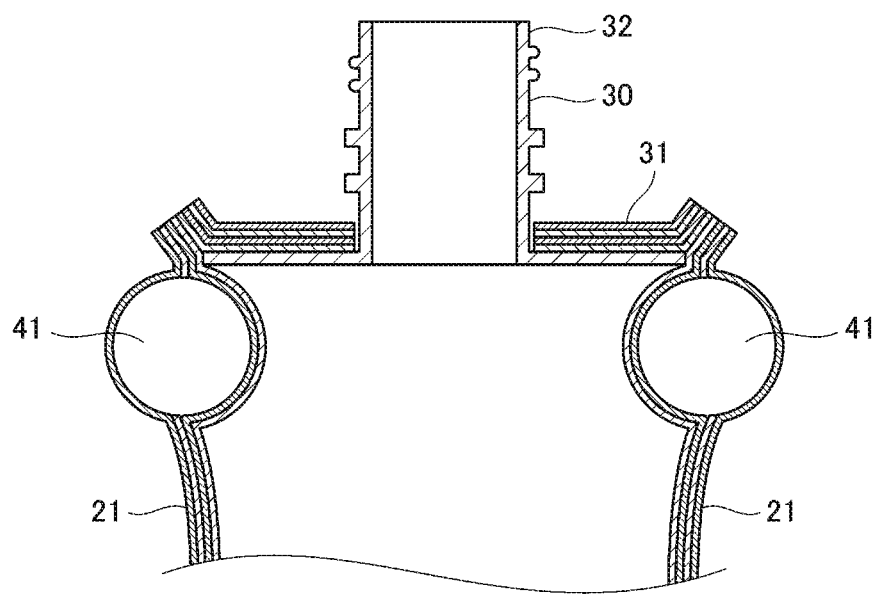
FIG. 8 is a cross-sectional view taken along surface VIII-VIII in the embodiment of FIG. 7.

Furthermore, it is preferable that the filler enclosed portion 41 is adjacent to the base part 31 of the spout 30 on at least one of both sides or preferably on each side of opposite sides across the containing portion of the container body 20 in the base material film lamination direction, because the container rigidity at the time of pumping can be further increased. It is further preferable that the container body 20 has the above-described configuration in addition to the filler enclosed portion 41 extending in the up-down direction. As used herein, the term "adjacent" refers to a state in which the sheet member that forms the filler enclosed portion 41 extending toward the upper end side of the container body 20 (an area on the opening 14 side when the container body 20 is divided equally into three areas in the up-down direction) is substantially in contact with the base part 31 of the spout 30, as in the embodiment illustrated in FIGS. 7 and 8. That is, the term "adjacent" refers to the state in which the above-described sheet member forming the filler enclosed portion 41 is directly in contact with the base part 31 of the spout 30 or the above-described sheet member forming the filler enclosed portion 41 and the base part 31 of the spout 30 may be directly in contact with each other by pumping or a pressure load equivalent to the pumping in a state in which the filler is enclosed in the filler enclosed portion 41 (for example, only an inevitable gap caused by the formation of the container exists therebetween). FIGS. 7 and 8 illustrate the embodiment in which the inner container 10 is not provided.

It is more preferable that on at least one of both sides or preferably on each side of opposite sides across the containing portion of the container body 20 in the base material film layer stack direction, at least one pair of filler enclosed portions 41 extending in the up-down direction of the container body 20 are brought into communication with each other through a filler enclosed portion 41 extending in the width direction of the container body 20 on the upper end side of the container body 20, and the filler enclosed portion 41 extending in the width direction is adjacent to the base part 31, because the filler enclosed portion 41 extending in the width direction can support the spout 30 at the time of pumping. For example, in the embodiment illustrated in FIGS. 7 and 8, the filler enclosed portion 41 that extends in the width direction on the upper end side of the container body 20 and through which the filler enclosed portions 41 extending in the up-down direction are brought into communication with each other is formed to be pressed to the base part 31 of the spout 30. Furthermore, at least a part of the filler enclosed portion 41 extending in the width direction extends to an inner side of the container body 20 than an outer end of the base part 31 of the spout 30 (an end opposite to a side attached to the cylinder part 32), and thereby supports the spout 30. In this embodiment, a configuration may be adopted in which the inner container 10 is further provided.

The filler may be fluid (gas or liquid), solid (for example, particulate, resin pellet, etc.) or semi-solid (for example, foam material, etc.), and is preferably gas such as air. An internal pressure of the filler enclosed portion 41 may be any pressure, but it is preferably higher than the atmospheric pressure from the standpoint of providing sufficient rigidity to the container body 20. The internal pressure can be set to, for example, preferably not lower than 10 kPa, more preferably not lower than 20 kPa, and not higher than 500 kPa, even more preferably not higher than 100 kPa, by gauge pressure conversion.

Figure 4:
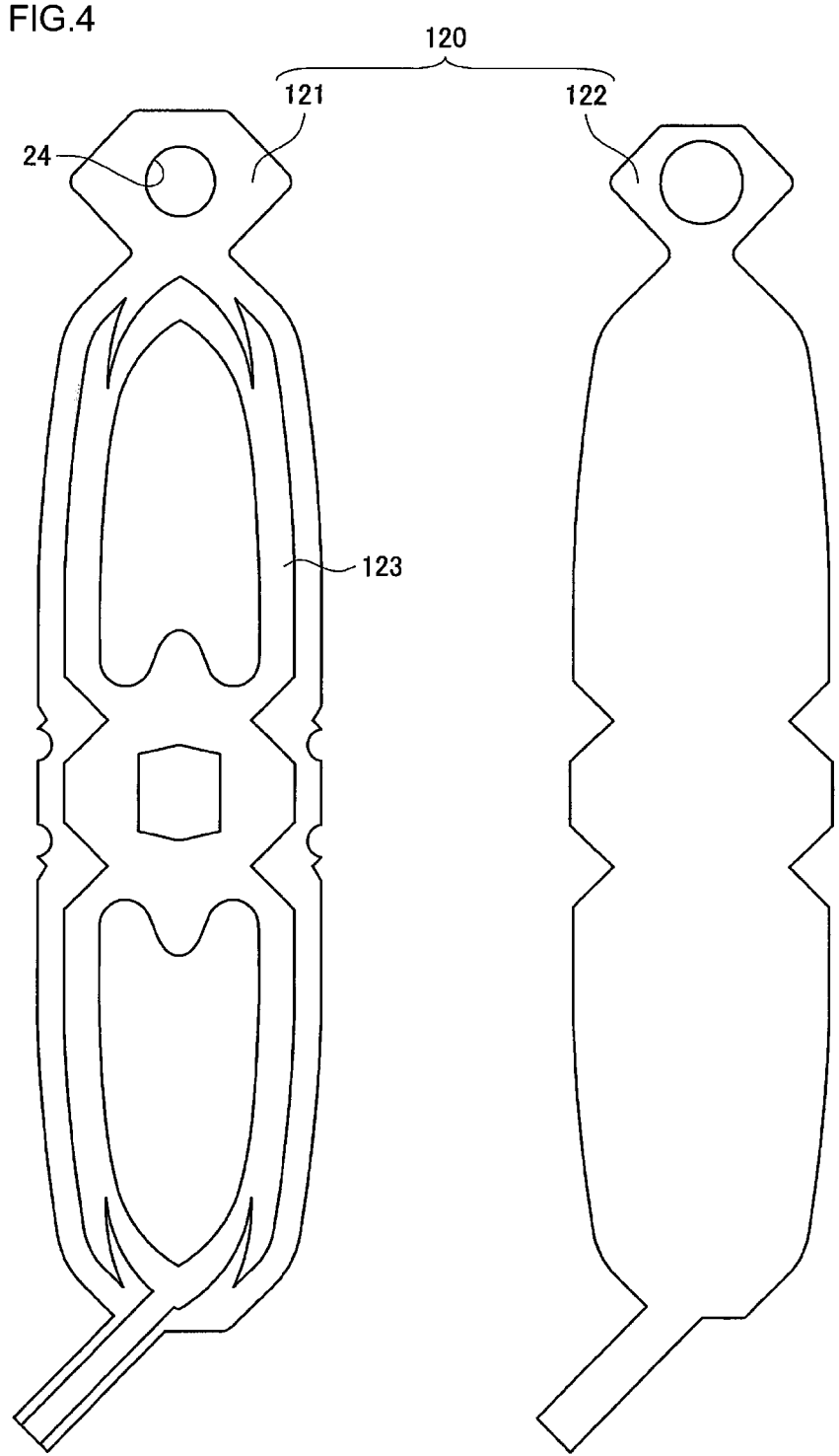
FIG. 4 is a plan view illustrating an example of a cover-forming sheet member.

The container body-forming sheet member 120 forming the container body 20 is formed by layering and attaching the film layers 121 and 122 to each other (for example, by heat sealing), as illustrated in FIGS. 4, 6, and 9. Although the details will be described later, the attaching layer 121*b* of the film layer 121 is attached to the base material film 122*a* of the film layer 122.

Figure 10:
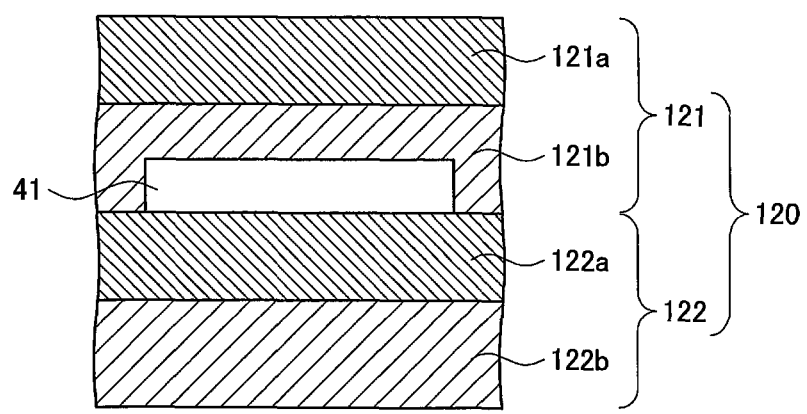
FIG. 10 is a cross-sectional view illustrating another example of a layer configuration of the cover-forming sheet member according to the present embodiment.
Figure 11:
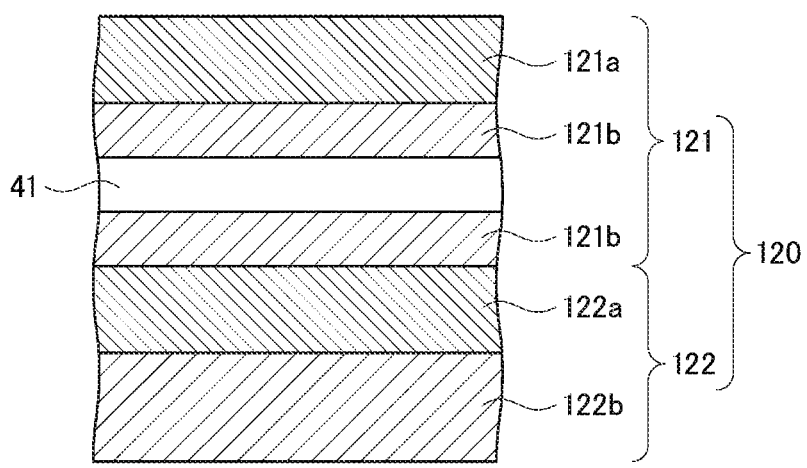
FIG. 11 is a cross-sectional view illustrating still another example of a layer configuration of the cover-forming sheet member according to the present embodiment.

Here, the film layers 121 and 122 are not partially attached, whereby a non-attached portion 123 is formed. The non-attached portion 123 forms a space between the film layers 121 and 122. When the space is filled with the filler, the filler enclosed portion 41 is formed. Accordingly, the non-attached portion 123 can be formed at any portion where the formation of the filler enclosed portion 41 is desired. As a method of forming the non-attached portion 123, the following methods are mentioned, for example. That is, the non-attached portion 123 is formed by pattern-applying an attaching agent onto the base material film 121a. In this case, the non-attached portion 123 is in contact with both base material films 121a and 122a (that is, the filler enclosed portion 41 is in contact with both base material films 121a and 122a). After the attaching agent is applied to the entire surface of the base material film 121a, only a portion of the attaching layer 121b may be adapted to be attached to the base material film 122a by pattern heating or an adhesion inhibiting agent. In this case, the non-attached portion 123 is in contact with the base material film 122a (that is, the filler enclosed portion 41 is in contact with the base material film 122a). Furthermore, after the attaching agents are applied to the entire surfaces of the base material films 121a and 122a, at least portions of the attaching layer 121b may be adapted not to be attached to each other by pattern heating or an adhesion inhibiting agent. In this case, the non-attached portion 123 is not in contact with both base material films 121a and 122a (that is, the filler enclosed portion 41 is in contact with the attaching layer 121b). In the example illustrated in FIG. 9, the filler enclosed portion 41 is in contact with both base material films 121a and 122a. In the example illustrated in FIG. 10, the filler enclosed portion 41 is in contact with the base material film 122a. In the example illustrated in FIG. 11, the filler enclosed portion 41 is not in contact with both base material films 121a and 122a. FIG. 11 illustrates, for the sake of convenience, a state in which two attaching layers 121b which are in contact with the filler enclosed portion 41 are separated from each other over the entire range, but these attaching layers 121b may be partially attached to each other.

Here, the filler introducing part 29 is formed at an end of the container body-forming sheet member 120, and a non-attached portion 123 is also formed in the filler introducing part 29. The filler introducing part 29 is a member that introduces the filler into the non-attached portion 123.

Examples of a method of performing the pattern heating include a method of forming a recess (groove) in a portion corresponding to the non-attached portion 123 in a die used for heat sealing the film layers 121 and 122, and a method of heating the film layers 121 and 122 while placing a spacer layer having no heat-sealing property in a portion corresponding to the non-attached portion 123 between the film layers 121 and 122.

The adhesion inhibiting agent may be freely selectable from those capable of inhibiting attaching between the attaching layer 121b and the base material film 122a or attaching between portions of the attaching layer 121b. As the adhesion inhibiting agent, suitable employable are printing inks used for offset printing, flexographic printing and letterpress printing, medium ink, and dedicated adhesion inhibition ink, for example. Also, thermosetting or UV-curable ink can be suitably used.

As illustrated in FIGS. 4 and 6, the film layer 121 is formed slightly larger than the film layer 122 (excluding the filler introducing part 29), and protrudes around the periphery of the film layer 122. That is, the peripheral edge portion of the container body-forming sheet member 120 is formed in an offset shape, and the attaching layer 121b of the film layer 121 is exposed. Accordingly, when the peripheral edge portions of the container body-forming sheet member 120 are to be attached to each other or the peripheral edge portion of the container body-forming sheet member 120 and the inner container-forming sheet member 110 are to be attached to each other, the exposed portions of the attaching layer 121b are attached to each other, or the exposed portion of the attaching layer 121b is attached to the inner container-forming sheet member 110. Of course, the film layer 122 and the film layer 121 may have the same shape. In this case, the portions of the attaching layer 122b of the film layer 122 are attached to each other, or the attaching layer 122b is attached to the inner container-forming sheet member 110.

(1-4. Method of Manufacturing Sheet Material Container)

First, as illustrated in FIGS. 4, 6, and 9, the container body-forming sheet member 120 is formed by layering the film layers 121 and 122 onto each other and partially attaching (for example, heat sealing) the film layers 121 and 122. That is, the film layers 121 and 122 are attached to each other so that a non-attached portion is partially provided between the film layers 121 and 121, whereby the non-attached portion 123 is formed. Accordingly, in the container body-forming sheet member 120, the film region in which the film layers 121 and 122 are attached to each other and the non-attached portion 123 in which the film layers 121 and 122 are not attached are formed.

Next, as illustrated in FIG. 6, the container body-forming sheet member 120 and the inner container-forming sheet member 110 are layered onto each other, and are partially attached to each other. In FIG. 6, an area where the container body-forming sheet member 120 and the inner container-forming sheet member 110 are attached to each other is hatched. That is, in the area corresponding to the top gussets 12 and 22 and the trunks 11 and 21, the peripheral edge portions of the inner container-forming sheet member 110 and the peripheral edge portions of the container body-forming sheet member 120 (that is, portions where the attaching layer 121b of the film layer 121 is exposed) are attached (for example, by heat sealing). Here, the inner container-forming sheet member 110 and the container body-forming sheet member 120 are attached to each other so that in an introducing part-forming part 117a illustrated in FIG. 5, the inner container-forming sheet member 110 and the container body-forming sheet member 120 are not partially attached. This non-attached portion corresponds to the outer air introducing part 26. In this way, the container forming sheet 400 formed of the container body-forming sheet member 120 and the inner container-forming sheet member 110 is formed. Subsequently, the spout 30 is provided to the container forming sheet 400. The container forming sheet 400 is divided into a top gusset sheet part 55, a top gusset attaching part 56, a main surface sheet part 51, a bottom gusset sheet part 53, a main surface sheet part 52, and a top gusset attaching part 57.

Subsequently, a sheet for container is formed by folding the container forming sheet 400 and by attaching the peripheral edge portions of the inner container-forming sheet member 110 to each other or the peripheral edge portions of the container body-forming sheet member 120 to each other. More specifically, the container forming sheet 400 is valley-folded along two folding lines 71 and one folding line 72, and mountain-folded at the folding line 73 and two folding lines 74.

Here, the two folding lines 71 are boundary lines between the bottom gusset sheet part 53 and the main surface sheet part 51 and between the bottom gusset sheet part 53 and the main surface sheet part 52. The folding line 72 is a boundary line between the top gusset sheet part 55 and the top gusset attaching part 56. The folding line 73 is a line passing through a center of the bottom gusset sheet part 53. The folding line 74 is a boundary line between the main surface sheet part 52 and the top gusset attaching part 57. The valley fold means a way of folding to make a crease protruding toward the far side in FIG. 6, whereas the mountain fold means a way of folding to make a crease protruding toward the near side in FIG. 6.

In this way, the top gusset sheet part 55 overlaps with the top gusset attaching part 56 and the top gusset attaching part 57. The main surface sheet parts 51 and 52 (excluding respective lower end portions) overlap each other, and the lower end portions of the main surface sheet parts 51 and 52 overlap with the bottom gusset sheet part 53. In this state, the peripheral edge portions are attached.

In this way, the sheet for container is formed. In the sheet for container, the sealed parts 25 and 27 are formed, and the inner container 10 and the container body 20 are formed. Subsequently, the filler is introduced into the non-attached portion 123 through the filler introducing part 29. As a consequence, the non-attached portion 123 expands to form the filler enclosed portion 41. The filler enclosed portion 41 provides the rigidity to the container body 20. Then, the filler enclosed portion 41 is sealed by sealing a filler injection port in the filler introducing part 29, and then the filler introducing part 29 is removed. Furthermore, the content 96 is filled into the inner container 10 through the spout 30. There is no particular limitation on the temporal relationship between a step of filling the filler into the non-attached portion 123 and a step of filling the content 96 into the inner container 10. These steps may be performed in any order or at the same time. The sheet material container 100 is manufactured through the above-described steps. The spout 30 of the sheet material container 100 can be sealed by the pumping cap, for example.

Although the sheet material container 100 according to the present embodiment has been described above, the sheet material container 100 according to the present embodiment is not limited, of course, to the above-described example. For example, the present embodiment is applicable to all of the sheet material containers having a configuration similar to the above-described configuration. Additionally, the sheet material container 100 need not include the inner container 10 (for example, FIGS. 7 and 8). The present embodiment is also applicable to such a sheet material container 100.

<2. Detailed Configuration of Sheet Member>

Next, a detailed configuration of the inner container-forming sheet member 110 and the container body-forming sheet member 120 will be described based on FIGS. 9 to 11. The container body-forming sheet member 120 has a layer structure in which the film layers 121 and 122 are layered onto each other. The film layer 121 includes the base material film 121a, and the attaching layer 121b, and the film layer 122 includes the base material film 122a, and the attaching layer 122b. The attaching layer 121b attaches the base material films 121a and 122a. Accordingly, it can be also said that the container body-forming sheet member 120 has a structure in which a plurality of base material films 121a and 122a are layered.

The base material films 121a and 122a has strength for maintaining the rigidity of the sheet material container 100. That is, as one of the measures to improve the environmental characteristics of the sheet material container 100, the films 121a and 122a are made thin. However, when the base material films 121a and 122a are merely made thin, the strength of the base material films 121a and 122a is reduced, whereby there is a possibility that the rigidity of the sheet material container 100 becomes insufficient. As described above, in the present embodiment, the filler enclosed portion 41 provides the rigidity to the sheet material container 100, but extremely low strength of the base material films 121a and 122a may cause insufficient rigidity of the sheet material container 100.

In the present embodiment, a tensile modulus of elasticity of the base material films 121a and 122a is preferably not less than 1 GPa at a room temperature (=25° C.). In this way, sufficient rigidity (for example, high compression strength) can be provided to the sheet material container 100. When the tensile modulus of elasticity of the base material films 121a and 122a is not less than 1 GPa at the room temperature (=25° C.), the sufficient rigidity can be provided to the sheet material container 100 even if the base material films 121a and 122a are made thinner. That is, the sufficient rigidity can be provided to the sheet material container 100 while the resin amount used for the container body-forming sheet member 120 is further reduced. The tensile modulus of elasticity of the base material films 121a and 122a is more preferably not less than 2 GPa at the room temperature, and even more preferably not less than 3 GPa at the room temperature. The tensile modulus of elasticity may be measured according to JIS K 7127 (Plastics—Determination of tensile properties, Part 3: Test conditions for films and sheets).

Examples of resins of the base material films 121a and 122a satisfying the above-described characteristics include not only polyamide-type resins such as nylon 6, nylon 11, nylon 12, nylon 46, and nylon 66, but also polyester-type resins such as polyethylene terephthalate (PET), polytrimethylene terephthalate (PTT), polybutylene terephthalate (PBT), polyethylene naphthalate (PEN), polybutylene naphthalate (PBN), polylactic acid (PLA), and polyhydroxy alkanoate (PHA), polyolefin-type resins such as polyethylene (PE), polypropylene (PP), and acrylonitrile butadiene styrene (ABS), acrylic-type resins, vinyl chloride-type resins, polycarbonate-type resins, polystyrene-type resins, ethylene-vinyl alcohol copolymer-type resins, and polyimide-type resins. The base material films 121a and 122a may be made from any one or more types of these resins. That is, the base material films 121a and 122a may be made from any one (single) type of resin or a blend of two or more types of resins among the resin types listed above. The resins forming the base material films 121a and 122a may contain other additives such as other polymeric materials, fillers (for example, glass, talc, or calcium carbonate), mold release agents, flame retardants, conductive agents, anti-static agents, pigments, antioxidants, impact modifiers, stabilizers, wetting agents, dyes, or any combination thereof.

Furthermore, the base material films 121a and 122a are made from the same type of resins. That is, the attributes of "-type" listed above are common between the base material films 121a and 122a. For example, in the case where the base material film 121a is made from a polyester-type resin, the base material film 122a is also made from a polyester-type resin. That is, the base material films 121a and 122a are similar in characteristics (for example, melting points and the like). In particular, it is more preferable that the base material films 121a and 122a are made from resins having the same (common) main skeleton, that is, a single type of resin. In the case where the base material films 121a and 122a are made from a blend of two or more types of resins or a copolymer resin, the phrase "made from the same type of resins" means that the main components are the same type of resins, that is, each base material film contains the same type of resin component or repeating unit in the resin component in an amount of more than 50% by mass, preferably not less than 60% by mass, more preferably not less than 70% by mass, even more preferably not less than 80% by mass, and still more preferably not less than 90%. This enables the base material films 121a and 122a to be easily separated from the sheet material container 100 after use (more specifically, from the container body-forming sheet member 120). This is because under an environment in which the base material film 121a can be separated from the container body-forming sheet member 120, the base material film 122a can be also separated at the same time. Accordingly, the recyclability of the sheet material container 100 can be improved, and thus the environmental characteristics can be improved. Furthermore, in the case where the base material films 121a and 122a are made from the same and single type of resin, the separated resin is a single type of resin, and therefore becomes a high-quality recycled material. Accordingly, the recyclability of the sheet material container 100 is further improved. Each of the base material films 121a and 122a may have a single-layer structure of the same type of resin or a multi-layer structure formed of the same type of resins. In the case where each of the base material films 121a and 122a has a single-layer structure of the same type of resin, there is an advantage that a delamination (layer separation) may not occur in the vicinity of the filler enclosed portion 41.

Printing may be provided on any one or more base material films of the base material films 121a and 122a. In the case where the base material films 121a and 122a are made from the above-described resins, the printing can be clear.

The attaching layers 121b and 122b are layers that provide the sealing property (heat-sealing property) to the container body-forming sheet member 120. From the standpoint of reducing the resin amount used for the container body-forming sheet member 120, it is preferable that the container body-forming sheet member 120 is made thinner as much as possible. From this standpoint, it is also conceivable that the film layers 121 and 122 are formed of only the base material films 121a and 122a. However, in the case where the base material films 121a and 122a have high tensile modulus of elasticity as described above, the sealing property of the base material films 121a and 122a may be insufficient. Therefore, in the present embodiment, the attaching layers 121b and 122b are provided to the film layers 121 and 122, and therefore the film layers 121 and 122 have the sealing property.

The attaching layer 121b is a portion that attaches the portions of the container body-forming sheet member 120 (that is, portions of the attaching layer 121b) to each other, that attaches the film layer 121 and the film layer 122, and that attaches the container body-forming sheet member 120 and the inner container-forming sheet member 110 (more specifically, a base material film 110a of the inner container-forming sheet member 110). The filler enclosed portion 41 is formed between the base material films 121a and 122a. The filler enclosed portion 41 may be in contact with each surface of the base material films 121a and 122a as illustrated in FIG. 9, and may be in contact with one base material film (in this example, the base material film 122a) as illustrated in FIG. 10. As illustrated in FIG. 11, the attaching layers 121b may be formed on the surfaces facing each other of the base material films 121a and 122a, respectively, and the filler enclosed portion 41 may be in contact with the two attaching layers 121b. In FIGS. 10 and 11, the inner container-forming sheet member 110 is not shown.

As described above, the attaching layer 122b is a portion that attaches the portions of the container body-forming sheet member 120 (that is, portions of the attaching layer 122b) to each other, and that attaches the container body-forming sheet member 120 and the inner container-forming sheet member 110. However, in the case where the film layer 121 is formed slightly larger than the film layer 122, the attaching layer 121b is used to attach the portions of the container body-forming sheet member 120 to each other and attach the container body-forming sheet member 120 and the inner container-forming sheet member 110. Accordingly, in this case, the attaching layer 122b is not necessarily required.

Furthermore, it is preferable that the melting point of the base material films 121a and 122a is different from that of the attaching layers 121b and 122b. In this case, using the difference in melting point between the base material films 121a and 122a and the attaching layers 121b and 122b, the base material films 121a and 122a can be easily separated from the container body-forming sheet member 120. The melting point of the base material films 121a and 122a is preferably higher than that of the attaching layers 121b and 122b, and the difference in melting point is preferably not less than 100° C., and more preferably not less than 150° C. An upper limit of the difference in melting point may be any value, but may be about 200° C.

Examples of resins (attaching agents) of the attaching layers 121b and 122b satisfying the above-described characteristics include known adhesive compositions such as an urethane-based adhesive composition, a vinyl-based adhesive composition such as vinyl acetate, vinyl alcohol, and ethylene vinyl acetate, a modified olefin-based adhesive composition, a (meta)acrylic-based adhesive composition containing butyl acrylate, 2-ethylhexyl methacrylate and the like as a main component, a polyamide-based adhesive composition, a polyester-based adhesive composition, a silicone-based adhesive composition, and a rubber-based adhesive composition containing, as main components, natural rubber and/or synthetic rubber such as isoprene rubber, butadiene-styrene-rubber, and acrylic rubber. The attaching layers 121b and 122b may be made from any one or more types of these resins. Similar to the base material films described above, the resins forming the attaching layers 121b and 122b may be the same type of resins as the base material films 121a and 122a. In this case, the affinity between the attaching layers 121b and 122b and the base material films 121a and 122a are enhanced, whereby the sealing property is improved. Furthermore, even if some attaching agent remains on the base material films 121a and 122a at the time of recycling of the base material films 121a and 122a, it is unlikely to affect the quality of the recycled material. Of course, the resins forming the attaching layers 121b and 122b may be of different types.

It is preferable that the total thickness of the base material films 121a and 122a has a range of ratios with respect to the thickness of the attaching layer 121b (that is, a attaching layer attaching the base material films 121a and 122a to each other). Specifically, the ratio (B/A) of the total thickness B of the base material films 121a and 122a with respect to the thickness A of the attaching layer 121b is preferably larger than 0.58. In this way, the thickness of the attaching layer 121b can be reduced, whereby the resin amount used can be reduced, and furthermore the resins of the base material films 121a and 122a can be easily separated from the sheet material container 100. The "B/A" is more preferably not smaller than 1.00, and even more preferably not smaller than 1.3. An upper limit of the "B/A" may be any value. However, when the "B/A" is too high, it may cause the total thickness of the film layers 121 and 122 to be increased excessively. Therefore, the "B/A" is preferably not larger than 60, more preferably not larger than 40, even more preferably not larger than 30, still more preferably not larger than 10, and further more preferably not larger than 3.

From the standpoint of improving the environmental characteristics, each thickness of the base material films 121a and 122a is preferably not more than 50 µm, more preferably not more than 40 µm, and even preferably not more than 30 µm. However, when each thickness of the base material films 121a and 122a is too small, the base material films 121a and 122a tend not to withstand the internal pressure required to sufficiently maintain the container rigidity when the filler is enclosed in the filler enclosed portion 41. Therefore, the thickness is preferably not less than 9 µm, more preferably not less than 12 µm, and even preferably not less than 15 µm.

The thickness of the attaching layer 121b is preferably not more than 50 µm, and more preferably not more than 30 µm. The thickness of the attaching layer 121b is preferably not less than 20 µm. In this case, the thickness of the container body-forming sheet member 120 can be reduced and the recyclability of the container body-forming sheet member 120 can be improved, while maintaining the rigidity of the sheet material container 100.

For the same reason, the thickness of the attaching layer 122b is also preferably not more than 50 µm, and more preferably not more than 30 µm. The thickness of the attaching layer 122b is preferably not less than 20 µm.

Additionally, the container body-forming sheet member 120 may have the multi-layer structure including three or more layers. In this case, since the base material films are formed in three or more layers, the attaching layers that attach the base material films to each other are formed in two or more layers. In this case, a value "A" in the above-described "B/A" is rephrased as the total thickness of the attaching layers that attach the base material films to each other, and the thickness of the attaching layer 121b is rephrased as the total thickness of the attaching layers that attach the base material films to each other.

<3. Detailed Configuration of Inner Container-Forming Sheet Member>

Next, a detailed configuration of the inner container-forming sheet member 110 will be described based on FIG. 9. The inner container-forming sheet member 110 according to the present embodiment includes the base material film 110a and an attaching layer 110b. The resin of the base material film 110a may be any resin, and may be of the same type as or different type from the base material films 121a and 122a. In the case where the resin of the base material film 110a is of the same type as the base material films 121a and 122a, a tensile modulus of elasticity of the base material film 110a is preferably not less than 1 GPa at a room temperature (=25° C.). Examples of other type of resin include oriented nylon and the like.

The attaching layer 110b is a layer that provides the sealing property to the inner container-forming sheet member 110. Specifically, the attaching layer 110b is used for attaching portions of the inner container-forming sheet member 110 to each other. The resin forming the attaching layer 110b may be any resin, and may be of the same type as or different type from the attaching layers 121b and 122b. Examples of other type of resin include linear low-density polyethylene (LLDPE) and the like.

As in the embodiment illustrated in FIG. 1, in the embodiment in which the inner container-forming sheet member 110 (the sheet member of the top gusset 12) and the base part 31 of the spout 30 are attached to each other, it is more preferable that the spout 30 provided with the base part 31 is made from the same type of resin as the base material film 110a and/or the attaching layer 110b of the inner container-forming sheet member 110 in a manner similar to the base material films described above, because the recyclability can be improved. Additionally, as in the embodiment illustrated in FIGS. 7 and 8, in the case of the embodiment in which the base part 31 of the spout 30 is attached to the container body-forming sheet member 120 (the sheet member of the top gusset 22), the spout 30 provided with the base part 31 may be made from resins of the same type as one or more resins selected from the resins of the base material films 121a and 122a and the attaching layers 121b and 122b of the container body-forming sheet member 120.

From the standpoint of the environmental characteristics, it is preferable that the base material film 110a is made thinner as much as possible. For example, the thickness of the base material film 110a is preferably not more than 30 µm, and more preferably not more than 20 µm. A lower limit of the thickness of the base material film 110a may be any value that can maintain the rigidity as the inner container 10. For example, the thickness of the base material film 110a may be not less than 10 µm.

From the standpoint of the environmental characteristics, it is also preferable that the attaching layer 110b is made thinner as much as possible. For example, the thickness of the attaching layer 110b is preferably not more than 100 µm, and more preferably not more than 60 µm. A lower limit of the thickness of the attaching layer 110b may be any value that can maintain the rigidity and the sealing property as the inner container 10. For example, the thickness of the attaching layer 110b may be not less than 20 µm.

Additionally, the layer structure of the inner container-forming sheet member 110 is not limited to the above-described example. For example, the inner container-forming sheet member 110 may have the layer structure disclosed in Japanese Patent No. 6193535. However, from the standpoint of the environmental characteristics, it is preferable that the inner container-forming sheet member 110 has the above-described layer structure.

As described above, according to the present embodiment, the base material films 121a and 122a are made from the same type of resins, whereby the recyclability can be improved. Furthermore, when the tensile modulus of elasticity of the base material films 121a and 122a is not less than 1 GPa at the room temperature, the sufficient rigidity can be provided to the sheet material container 100. Therefore, according to the present embodiment, the recyclability can be further improved while maintaining a function of the sheet material container 100. Additionally, when the tensile modulus of elasticity of the base material films 121a and 122a is not less than 1 GPa, the sufficient rigidity can be provided to the sheet material container 100 even if the base material films 121a and 122a are made thinner. Accordingly, since the resin amount used can be reduced, the environmental characteristics can be further improved.

EXAMPLES

1. Examples 1 to 32

(1-1. Preparation of Base Material Films and Attaching Agent)

In Examples 1 to 31, PET films having thicknesses different from one another were prepared as the base material films 121a and 122a. Also, polyester-based attaching agents (manufactured by TOAGOSEI CO., LTD.) were prepared as the attaching agents forming the attaching layers 121b and 122b. Furthermore, in Example 32, nylon films were prepared as the base material films 121a and 122a, and polyethylene films (LLDPE) were prepared as the attaching layers 121b and 122b.

(1-2. Evaluation of Environmental Characteristics (Thickness Reduction and Recyclability))

The environmental characteristics of Examples 1 to 32 (specifically, thickness reduction and recyclability) were evaluated by the following tests. First, in each of Examples 1 to 31, a sheet member for test was manufactured in which the base material films 121a and 122a were attached by the above-described attaching layer 121b. The pressure and temperature at the time of attaching were common among all examples and comparative examples described later. The sheet member for test included the base material films 121a and 122a and the attaching layer 121b. The thickness of the base material films 121a and 122a and the attaching layer 121b was changed for each example. In Example 32, the base material films 121a and 122a and two attaching layers 121b were attached by dry lamination, and a sheet member for test was manufactured, including the filler enclosed portion 41 between the two attaching layers 121b, as illustrated in FIG. 11.

Next, the thickness of the sheet member for test was measured. A sheet member (PET12/aluminum-deposited PET12/NY15/LLDPE70) of a commercially available pouch having no filler enclosed portion was used as a reference sample. The thickness (109 μm) of the reference sample was regarded as 100, and a ratio of the thickness of the sheet member for test in each of Examples 1 to 32 with respect to the reference sample was used as an evaluation index of thickness reduction. A ratio value of 100 or less is an acceptable level in view of evaluation of the thickness reduction, and the ratio value is preferably not more than 50. Additionally, the "B/A" was calculated.

Furthermore, evaluation of the recyclability was performed using the sheet member for test. Specifically, the heat was applied to the entire surface of the sheet member for test at 150° C. and 0.5 MPa for 10 sec., and then it was confirmed whether the base material films 121a and 122a were easily separated from the sheet member for test manually. In the case where the base material film 121a is easily separated from the sheet member for test manually, the recyclability is evaluated at a level 2 or higher. In the case where the base material film 121a is not easily separated from the sheet member for test, the recyclability is evaluated at a level 3 when the base material films 121a and 122a are made from the same type of resins, and the recyclability is evaluated at a level 4 when the base material films 121a and 122a are made from different (different types of) resins. The level 4 is regarded as unacceptable, and the level 3 or higher is regarded as acceptable. This is because it is preferable that the base material films 121a and 122a can be easily separated from the attaching layer 121b manually, from the standpoint of the recyclability.

With respect to the sheet members for test in which the recyclability was evaluated at the level 2 or higher, the following tests were further performed. First, the mass of the base material films 121a and 122a only were measured, and then the mass of the sheet members for test was measured, in which the base material films 121a and 122a were attached by the attaching layer 121b. Then, the mass of the attaching layer 121b before cleaning was calculated based on the difference between the measured masses. Subsequently, the base material films 121a and 122a were immersed in acetone (cleaning solution) and stirred for 12 hours. In this test, the acetone was used, but a known alkaline cleaning solution including an alkaline aqueous solution such as caustic soda or a general organic solvent such as ethanol may be used as the cleaning solution. Then, the base material films 121a and 122a were taken out of the acetone, washed with water, and dried. Subsequently, the mass of the base material films 121a and 122a after the drying was measured. The mass of remaining attaching layer 121b was calculated by subtracting, from the measured mass, the initial measured mass of the base material films 121a and 122a. The remaining ratio was calculated by the following formula: (the mass of the remaining attaching layer/the initial mass of the attaching layer)×100. When the remaining ratio is not more than 30%, the recyclability is evaluated at a level 1. When the remaining ratio exceeds 30%, the recyclability is evaluated at a level 2. Lower remaining ratio of the attaching layer 121b means that a larger amount of pure PET was able to be recovered, and therefore the recyclability is high. The sample with the evaluation level 2 was stirred in the acetone for further 12 hours, and the remaining ratio of 30% or less was obtained.

(1-3. Evaluation of Container Rigidity)

The film layers 121 and 122 were manufactured using the above-described base material films 121a and 122a and attaching layers 121b and 122b. Here, the thickness of the base material films 121a and 122a and the thickness of the attaching layers 121b and 122b were the same as the thickness of the base material films 121a and 122a and the thickness of the attaching layer 121b in the sheet member for test. Furthermore, as the inner container-forming sheet member 110, an inner container-forming sheet member 110 similar to that of Comparative Example 1 (which will be described later) was prepared. Then, a sheet material container 100 was manufactured according to the above-described manufacturing method. Here, all of the manufacturing conditions of the sheet material container 100 (shapes of the film layers 121 and 122, a shape of the filler enclosed portion 41, a type of the filler, an internal pressure of the filler enclosed portion, a sealing pressure, a sealing temperature, widths of the sealed parts 25 and 27, and the like) were the same as the above-described manufacturing conditions. That is, the sheet material containers 100 of Examples 1 to 32 are different only in the layer structures of the film layers 121 and 122 (specifically, a thickness and a material of each layer).

Then, the manufactured sheet material container 100 was set to a compression tester. The compression tester includes two upper and lower compression plates, a compressor that compresses the sheet material container 100 using these compression plates, and a measuring device that measures a stress at the time of compression. Then, the sheet material container 100 was compressed using the compression plates. The compression was performed under the environment of 20° C. and 65% RH. The compression speed was set to 20 mm/min. Then, the stress was read when the height of the sheet material container 100 was compressed to ¾ of the initial height, and was compared with a stress of Comparative Example 3 described later. The container rigidity was evaluated according to the following evaluation criteria. A level 4 or lower are regarded as acceptable in view of evaluation of the container rigidity, and means that the container has an anti-compression strength enough to withstand use (pumping or the like) as a container.

1: The stress is not less than 3.0 times of that of Comparative Example 3.
2: The stress is not less than 1.5 times and less than 3.0 times of that of Comparative Example 3.
3: The stress is not less than 1.0 time and less than 1.5 times of that of Comparative Example 3.
4: The stress is less than 1.0 time of that of Comparative Example 3, but the sheet material container 100 did not buckle during the compression test.
5: The stress is less than 1.0 time of that of Comparative Example 3, and the sheet material container 100 buckled during the compression test.

2. Comparative Examples 1 to 3

(2-1. Layer Configuration of Sheet Member)

Figure 12:
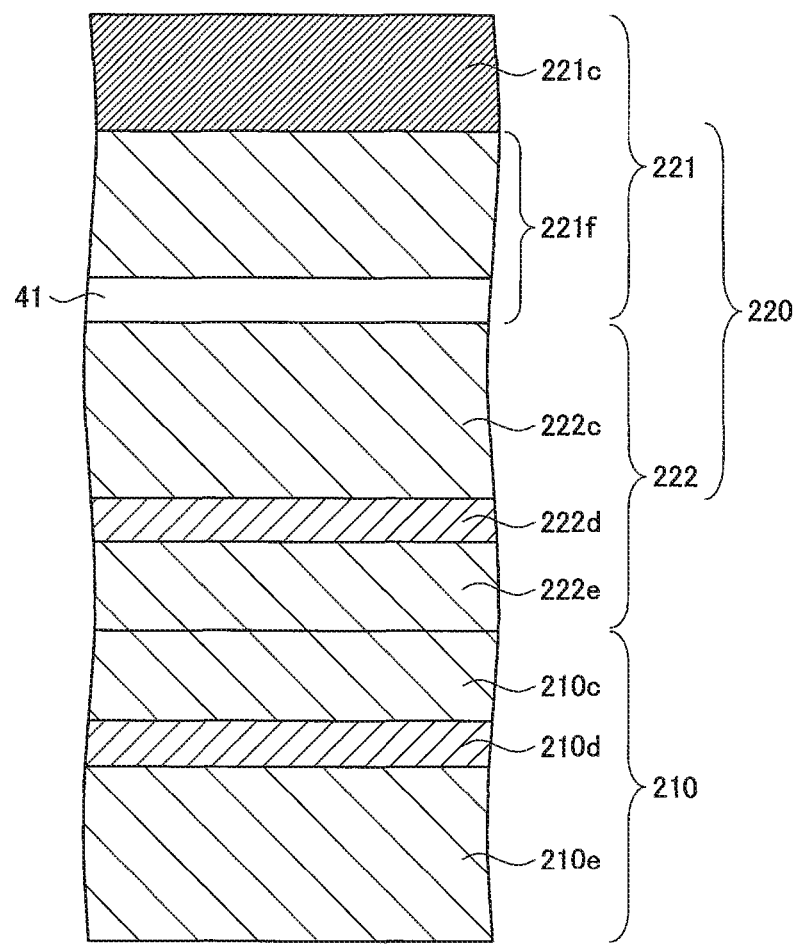
FIG. 12 is a cross-sectional view illustrating an example of a layer configuration of a cover-forming sheet member and an inner container-forming sheet member according to comparative examples.

First, the layer configuration of the sheet member used in each of Comparative Examples 1 to 3 will be described based on FIG. 12. A container body-forming sheet member 220 used in each of Comparative Examples 1 to 3 includes film layers 221 and 222. The film layer 221 is a layer corresponding to the film layer 121 of the present embodiment, and includes a base material film 221c and an attaching layer 221f. The film layer 222 is a layer corresponding to the film layer 122 of the present embodiment, and includes an attaching layer 222c, a base material film 222d and an attaching layer 222e. It can be said that attaching layers 221f and 222c correspond to the attaching layer 121b of the present embodiment, and an attaching layer 222e corresponds to the attaching layer 122b of the present embodiment. A filler enclosed portion 41 is formed between the base material films 221c and 222d. An inner container-forming sheet member 210 includes an attaching layer 210c, a base material film 210d, and an attaching layer 210e.

In each of Comparative Examples 1 to 3, all of the attaching layers included in the inner container-forming sheet member 210 and the container body-forming sheet member 220 are made from LLDPE. In Comparative Example 1, the base material film 221c had a three-layer structure including a PET layer, a transparent vapor deposited PET layer, and a nylon layer laminated in order from the surface. In Comparative Example 2, the base material film 221c had a two-layer structure including a transparent vapor deposited PET layer, and a nylon layer laminated in order from the surface. In Comparative Example 3, the base material film 221c had a single-layer structure including a transparent vapor deposited PET layer from the surface. In all of Comparative Examples 1 to 3, the base material films 222d and 210d were made from oriented nylon.

(2-2. Evaluation of Thickness Reduction and Recyclability)

The base material film 221c in which the attaching layer 221f was formed on a surface thereof and the base material film 222d in which the attaching layer 222c was formed on a surface thereof were prepared, and the base material films 221c and 222d overlapped each other so that the respective attaching layers faced each other. The thickness of the base material films 221c and 222d and the attaching layers 221f and 222c was set to be different among Comparative Examples 1 to 3. Then, the multilayer was pressurized at the same pressure and temperature as those of Examples 1 to 32. In this way, a sheet member for test was manufactured. Then, the thickness reduction and the recyclability were evaluated by the tests similar to those of Examples 1 to 32. Additionally, the "B/A" was calculated. Here, "A" refers to the total thickness of the attaching layers 221f and 222c.

(2-3. Evaluation of Container Rigidity)

A sheet material container was manufactured using the container body-forming sheet member 220 and the inner container-forming sheet member 210. Here, the thickness of the base material films 221c and 222d and the thickness of the attaching layers 221f and 222c were the same as the thickness of the base material films 221c and 222d and the thickness of the attaching layers 221f and 222c in the sheet member for test. The thickness of the attaching layer 222e was set to 30 μm, and the thicknesses of the attaching layer 210c, the base material film 210d, and the attaching layer 210e were set to 30 μm, 15 μm, and 60 μm, respectively. Then, a sheet material container was manufactured according to the above-described manufacturing method. Here, all of the manufacturing conditions of the sheet material container were the same as those of Examples 1 to 32. That is, the sheet material containers of Comparative Examples 1 to 3 are different only in the layer structures (specifically, a thickness of each layer and resin types) of the film layers 221 and 222 from the sheet material containers of Examples 1 to 32. Then, the container rigidity was evaluated by the tests similar to those of Examples 1 to 32.

<3. Evaluation>

The layer configurations (layer configuration of the sheet member for test) and evaluation results of Examples 1 to 32 and Comparative Examples 1 to 3, and the tensile moduluses of elasticity of the base material films 121a and 122a made from the same type of resins of Examples 1 to 32 that were measured at the room temperature (=25° C.) according to JIS K 7127 (Plastics—Determination of tensile properties, Part 3: Test conditions for films and sheets) are summarized in Tables 1 to 3.

TABLE 1

|  | Example 1 | Example 2 | Example 3 | Example 4 | Example 5 | Example 6 | Example 7 | Example 8 |
| --- | --- | --- | --- | --- | --- | --- | --- | --- |
| Thickness (μm) of base material film 121a | 9 | 12 | 20 | 25 | 9 | 12 | 20 | 25 |
| Thickness (μm) of attaching layer 121b | 1 | 1 | 1 | 1 | 5 | 5 | 5 | 5 |
| Thickness (μm) of base material film 122a | 9 | 12 | 20 | 25 | 9 | 12 | 20 | 25 |

TABLE 1-continued

|  | | | | | | | | |
|---|---|---|---|---|---|---|---|---|
| B | 18 | 24 | 40 | 50 | 18 | 24 | 40 | 50 |
| A | 1 | 1 | 1 | 1 | 5 | 5 | 5 | 5 |
| Thickness (μm) of sheet member for test (=A + B) | 19 | 25 | 41 | 51 | 23 | 29 | 45 | 55 |
| B/A | 18 | 24 | 40 | 50 | 3.6 | 4.8 | 8 | 10 |
| Container rigidity | 4 | 4 | 3 | 3 | 4 | 4 | 3 | 3 |
| Environmental characteristics  Thickness reduction | 17 | 23 | 38 | 47 | 21 | 27 | 41 | 50 |
| Recyclability | 1 | 1 | 1 | 1 | 1 | 1 | 1 | 1 |
| Tensile modulus of elasticity (GPa) of base material film | 4 | 4 | 4 | 4 | 4 | 4 | 4 | 4 |

|  | Example 9 | Example 10 | Example 11 | Example 12 | Example 13 | Example 14 | Example 15 | Example 16 |
|---|---|---|---|---|---|---|---|---|
| Thickness (μm) of base material film 121a | 9 | 12 | 20 | 25 | 9 | 12 | 20 | 25 |
| Thickness (μm) of attaching layer 121b | 10 | 10 | 10 | 10 | 20 | 20 | 20 | 20 |
| Thickness (μm) of base material film 122a | 9 | 12 | 20 | 25 | 9 | 12 | 20 | 25 |
| B | 18 | 24 | 40 | 50 | 18 | 24 | 40 | 50 |
| A | 10 | 10 | 10 | 10 | 20 | 20 | 20 | 20 |
| Thickness (μm) of sheet member for test (=A + B) | 28 | 34 | 50 | 60 | 38 | 44 | 60 | 70 |
| B/A | 1.8 | 2.4 | 4 | 5 | 0.9 | 1.2 | 2 | 2.5 |
| Container rigidity | 4 | 3 | 3 | 3 | 3 | 3 | 3 | 2 |
| Environmental characteristics | 26 | 31 | 46 | 55 | 35 | 40 | 55 | 64 |
|  | 1 | 1 | 1 | 1 | 1 | 1 | 1 | 1 |
| Tensile modulus of elasticity (GPa) of base material film | 4 | 4 | 4 | 4 | 4 | 4 | 4 | 4 |

TABLE 2

|  | Example 17 | Example 18 | Example 19 | Example 20 | Example 21 | Example 22 | Example 23 | Example 24 |
|---|---|---|---|---|---|---|---|---|
| Thickness (μm) of base material film 121a | 9 | 12 | 20 | 25 | 9 | 12 | 20 | 25 |
| Thickness (μm) of attaching layer 121b | 30 | 30 | 30 | 30 | 50 | 50 | 50 | 50 |
| Thickness (μm) of base material film 122a | 9 | 12 | 20 | 25 | 9 | 12 | 20 | 25 |
| B | 18 | 24 | 40 | 50 | 18 | 24 | 40 | 50 |
| A | 30 | 30 | 30 | 30 | 50 | 50 | 50 | 50 |
| Thickness (μm) of sheet member for test (=A + B) | 48 | 54 | 70 | 80 | 68 | 74 | 90 | 100 |
| B/A | 0.6 | 0.8 | 1.33 | 1.67 | 0.36 | 0.48 | 0.8 | 1 |
| Container rigidity | 3 | 3 | 2 | 2 | 3 | 3 | 2 | 2 |
| Environmental characteristics  Thickness reduction | 44 | 50 | 64 | 73 | 62 | 68 | 83 | 92 |
| Recyclability | 1 | 1 | 1 | 1 | 2 | 2 | 2 | 2 |
| Tensile modulus of elasticity (GPa) of base material film | 4 | 4 | 4 | 4 | 4 | 4 | 4 | 4 |

|  | Example 25 | Example 26 | Example 27 | Example 28 | Example 29 | Example 30 | Example 31 | Example 32 |
|---|---|---|---|---|---|---|---|---|
| Thickness (μm) of base material film 121a | 9 | 12 | 20 | 9 | 12 | 20 | 25 | 15 |
| Thickness (μm) of attaching layer 121b | 75 | 75 | 75 | 100 | 100 | 100 | 100 | 40 |
| Thickness (μm) of base material film 122a | 9 | 12 | 20 | 9 | 12 | 20 | 25 | 15 |
| B | 18 | 24 | 40 | 18 | 24 | 40 | 50 | 30 |
| A | 75 | 75 | 75 | 100 | 100 | 100 | 100 | 40 |
| Thickness (μm) of sheet member for test (=A + B) | 93 | 99 | 115 | 118 | 124 | 140 | 150 | 70 |

TABLE 2-continued

| | | | | | | | | |
|---|---|---|---|---|---|---|---|---|
| B/A | 0.24 | 0.32 | 0.53 | 0.18 | 0.24 | 0.4 | 0.5 | 0.75 |
| Container rigidity | 3 | 3 | 3 | 3 | 3 | 3 | 3 | 3 |
| Environmental characteristics | 85 | 91 | 106 | 108 | 114 | 128 | 138 | 64 |
| | 2 | 2 | 2 | 2 | 2 | 2 | 2 | 3 |
| Tensile modulus of elasticity (GPa) of base material film | 4 | 4 | 4 | 4 | 4 | 4 | 4 | 1 |

TABLE 3

| | Comparative Example 1 | Comparative Example 2 | Comparative Example 3 |
|---|---|---|---|
| Thickness (μm) of base material film 221c | 39 | 27 | 15 |
| Total thickness (μm) of attaching layers 221f and 222c | 110 | 72 | 40 |
| Thickness (μm) of base material film 222d | 15 | 15 | 15 |
| B | 54 | 42 | 30 |
| A | 110 | 72 | 40 |
| Thickness (μm) of sheet member for test (=A + B) | 164 | 114 | 70 |
| B/A | 0.49 | 0.58 | 0.75 |
| Container rigidity | 1 | 2 | 3 |
| Environmental characteristics — Thickness reduction | 150 | 105 | 64 |
| Environmental characteristics — Recyclability | 4 | 4 | 4 |
| Tensile modulus of elasticity (GPa) of base material film | — | — | — |

In Examples 1 to 32 having the layer configuration corresponding to the container body-forming sheet member 120 of the present embodiment, all values of the recyclability achieved the acceptable level of 3 or higher. Furthermore, all value of the container rigidity also achieved the acceptable level of 4 or lower. Accordingly, the recyclability can be improved while maintaining a function of the sheet material container 100. On the other hand, in all of Comparative Examples 1 to 3, the results of the recyclability became inferior (the evaluation level was 4). In Comparative Examples 1 to 3, it is believed that the recyclability was reduced because the attaching layer could not be easily separated from the base material film even at the same temperature as the Examples 1 to 32, and a component derived from the attaching layer could not be sufficiently removed even after the cleaning operation was performed.

From the results of Examples 1 to 32, it has been found that the container rigidity and the environmental characteristics (in particular, thickness reduction) are basically in a tradeoff relationship. That is, when the thickness of the base material films 121a and 122a and the attaching layer 121b is increased, the container rigidity is increased, but the environmental characteristics tend to be reduced. However, it has been found that when the thickness of the attaching layer 121b becomes too large relative to the thickness of the base material films 121a and 122a, the container rigidity is slightly reduced. This reason is unclear, however, it is believed that since the attaching layer 121b is soft, the container body-forming sheet member 120 is more flexible by increasing the thickness of the attaching layer 121b relative to the base material films 121a and 122a.

Upon reviewing the results in more detail, in Examples 1 to 24, and 32 in which the thickness of the attaching layer 121b is not more than 50 μm, the results of at least one of the thickness reduction and the container rigidity was further improved as compared with Examples 25 to 31 in which the thickness of the attaching layer 121b exceeds 50 μm.

Accordingly, it has been found that the thickness of the attaching layer 121b is preferably not more than 50 μm.

Next, upon reviewing Examples 1 to 24 and 32, it has been found that in Examples 1 to 20 in which the thickness of the attaching layer 121b is not more than 30 μm, the recyclability is further improved as compared with Examples 21 to 24 and 32 in which the thickness of the attaching layer 121b exceeds 30 μm. Accordingly, it has been found that the thickness of the attaching layer 121b is more preferably not more than 30 μm.

Next, upon reviewing Examples 1 to 20, in Examples 13 to 20 in which the thickness of the attaching layer 121b is not less than 20 μm and the "B/A" is larger than 0.58, the container rigidity was further improved and stabilized as compared with Examples 1 to 12 in which the thickness of the attaching layer 121b is less than 20 μm. That is, in Examples 1 to 12, since the attaching layer 121b was thin, it caused variations in the results of the container rigidity. Meanwhile, in Examples 13 to 20 in which the thickness of the attaching layer 121b is not less than 20 μm and the "B/A" is larger than 0.58, the results of the container rigidity were stably evaluated at a level 3 or lower. Accordingly, it has been found that the thickness of the attaching layer 121b is more preferably not less than 20 μm. Furthermore, it has been found that the "B/A" is preferably larger than 0.58.

The preferred embodiment of the present invention has been described in detail above with reference to the accompanying drawings, but the present invention is not limited to such an example. It is obvious that a person having ordinary skill in the art to which the present invention pertains can arrive at various alternations or modifications within the scope of the technical ideas set forth in the claims. These alternations or modifications are understood to naturally fall within the technical scope of the present invention. For example, in the above-described embodiment, an example in which the sheet material container 100 includes the inner container 10 has been described, but the sheet material container 100 does not necessarily include the inner container 10.

The above-described embodiment includes the following technical concepts.

<1> A sheet material container, comprising a container body that surrounds a containing portion for accommodating a content, wherein the container body is formed of a container body-forming sheet member formed by layering a plurality of base material films, the container body-forming sheet member includes the plurality of base material films, an attaching layer by which the base material films are attached to each other, and a filler enclosed portion that is formed between the plurality of base material films and into which a filler is to be filled, and the plurality of base material films are made from the same type of resins.

<2> The sheet material container according to <1>, wherein
a tensile modulus of elasticity of the plurality of base material films is not less than 1 GPa at a room temperature, preferably not less than 2 GPa, and more preferably not less than 3 GPa.

<3> The sheet material container according to <1> or <2>, wherein
a total thickness of the attaching layer is not more than 50 µm, and preferably not more than 30 µm.

<4> The sheet material container according to any one of <1> to <3>, wherein
a ratio of a total thickness of the plurality of base material films to the total thickness of the attaching layer is larger than 0.58, preferably not smaller than 1.00, and more preferably not smaller than 1.3.

<5> The sheet material container according to any one of <1> to <4>, wherein
the ratio of the total thickness of the plurality of base material films to the total thickness of the attaching layer is not larger than 60, preferably not larger than 40, more preferably not larger than 30, even more preferably not larger than 10, and still more preferably not larger than 3.

<6> The sheet material container according to any one of <1> to <5>, wherein
each thickness of the plurality of base material films is not less than 9 µm, preferably not less than 12 µm, and more preferably not less than 15 µm.

<7> The sheet material container according to any one of <1> to <6>, wherein
each thickness of the plurality of base material films is not more than 50 µm, preferably not more than 40 µm, and more preferably not more than 30 µm.

<8> The sheet material container according to any one of <1> to <7>, wherein
a melting point of the plurality of base material films is different from a melting point of the attaching layer, the melting point of the plurality of base material films is preferably higher than the melting point of the attaching layer, the melting point of the plurality of base material films is higher than the melting point of the attaching layer more preferably by 100° C. or more, even more preferably by 150° C. or more, and still more preferably by 200° C. or more.

<9> The sheet material container according to any one of <1> to <8>, wherein
the filler enclosed portion is in contact with one or both of the base material films of two layers between which the attaching layer is attached.

<10> The sheet material container according to any one of <1> to <9>, wherein
the plurality of base material films are made from any one or more types of resins selected from polyamide-type resins, polyester-type resins, polyolefin-type resins, acrylic-type resins, vinyl chloride-type resins, polycarbonate-type resins, polystyrene-type resins, ethylene-vinyl alcohol copolymer-type resins, and polyimide-type resins.

<11> The sheet material container according to <10>, wherein
the plurality of base material films are made from polyamide-type resins or polyester-type resins.

<12> The sheet material container according to any one of <1> to <11>, wherein
the plurality of base material films and the attaching layer are made from the same type of resins.

<13> The sheet material container according to <12>, wherein
the plurality of base material films and the attaching layer are made from polyester-type resins.

<14> The sheet material container according to any one of <1> to <11>, wherein
the plurality of base material films are made from polyamide-type resins and the attaching layer is made from polyolefin-type resins.

<15> The sheet material container according to any one of <1> to <14>, wherein
printing is provided on any one or more base material films of the plurality of base material films.

<16> The sheet material container according to any one of <1> to <15>, wherein
the plurality of base material films each have a single-layer structure.

<17> The sheet material container according to any one of <1> to <16>, wherein
the filler enclosed portion includes a configuration extending in an up-down direction in the container body.

<18> The sheet material container according to <17>, wherein
at least one pair of the filler enclosed portions extending in the up-down direction of the container body are provided along both edge portions in a width direction of the container body on each side of opposite sides across the containing portion of the container body.

<19> The sheet material container according to any one of <1> to <18>, wherein
a top gusset is formed at an upper end of the sheet material container, and a sheet member of the top gusset is attached to a base part of a spout provided with the base part.

<20> The sheet material container according to <19>, wherein
the spout is made from the same type of resins as the plurality of base material films or the attaching layer.

<21> The sheet material container according to <19> or <20>, wherein
the filler enclosed portion is adjacent to the base part of the spout on at least one of both sides across the containing portion of the container body.

<22> The sheet material container according to <21>, wherein
on at least one of both sides across the containing portion of the container body, at least one pair of the filler enclosed portions extending in the up-down direction of the container body are brought into communication with each other through the filler enclosed portion extending in the width direction of the container body on the upper end of the container body, and the filler enclosed portion extending in the width direction is adjacent to the base part.

<23> The sheet material container according to any one of <1> to <22>, comprising an inner container that is surrounded by the container body,
wherein the inner container has the containing portion, and is made from the same type of resins as the plurality of base material films.

This application claims priority based on Japanese Patent Application No. 2018-220380 filed on Nov. 26, 2018, the entire disclosure of which is incorporated herein.

REFERENCE SIGNS LIST

100 Sheet material container
10 Inner container
20 Container body
41 Filler enclosed portion
110 Inner container-forming sheet member 110a Base material film
110b Attaching layer
120 Container body-forming sheet member
121 Film layer
121a Base material film
121b Attaching layer
122 Film layer
122a Base material film
122b Attaching layer

The invention claimed is:

1. A sheet material container, comprising:
a container body that surrounds a containing portion for accommodating a content, wherein
the container body is formed of a container body-forming sheet member formed by layering a plurality of base material films,
the container body-forming sheet member includes:
the plurality of base material films,
an attaching layer by which the base material films are attached to each other, and
a filler enclosed portion that is formed between the plurality of base material films and into which a filler is to be filled,
the plurality of base material films are made from the same type of resins,
a total thickness of the attaching layer is not less than 1 µm to not more than 30 µm, and
a ratio of a total thickness of the plurality of base material films to the total thickness of the attaching layer is greater than 0.58 to not greater than 60.

2. The sheet material container according to claim 1, wherein
a tensile modulus of elasticity of the plurality of base material films is not less than 1 GPa at a room temperature.

3. The sheet material container according to claim 1, wherein each thickness of the plurality of base material films is not less than 9 µm.

4. The sheet material container according to claim 1, wherein each thickness of the plurality of base material films is not more than 50 µm.

5. The sheet material container according to claim 1, wherein the plurality of base material films are made from polyamide-type resins or polyester-type resins.

6. The sheet material container according to claim 1, wherein the plurality of base material films and the attaching layer are made from the same type of resins.

7. The sheet material container according to claim 6, wherein
the same type of resins are polyester-type resins, and
the attaching layer is formed, to which an attaching agent is applied.

8. The sheet material container according to claim 1, wherein printing is provided on any one or more base material films of the plurality of base material films.

9. The sheet material container according to claim 1, wherein the plurality of base material films each have a single-layer structure.

10. The sheet material container according to claim 1, wherein the filler enclosed portion includes a configuration extending in an up-down direction in the container body.

11. The sheet material container according to claim 10, wherein at least one pair of the filler enclosed portions extending in the up-down direction of the container body are provided along both edge portions in a width direction of the container body on each side of opposite sides across the containing portion of the container body.

12. The sheet material container according to claim 1, wherein
a top gusset is formed at an upper end of the sheet material container, and
a sheet member of the top gusset is attached to a base part of a spout provided with the base part.

13. The sheet material container according to claim 12, wherein the filler enclosed portion is adjacent to the base part of the spout on at least one of both sides across the containing portion of the container body.

14. The sheet material container according to claim 13, wherein
on at least one of both sides across the containing portion of the container body, at least one pair of the filler enclosed portions extending in an up-down direction of the container body are brought into communication with each other through the filler enclosed portion extending in a width direction of the container body on the upper end of the container body, and
the filler enclosed portion extending in the width direction is adjacent to the base part.

15. The sheet material container according to claim 14, wherein at least a part of the filler enclosed portion extending in the width direction extends to an inner side of the container body than an outer end of the base part of the spout and supports the spout from below.

16. The sheet material container according to claim 1, further comprising:
an inner container that is surrounded by the container body,
wherein the inner container has the containing portion and is made from the same type of resins as the plurality of base material films.

17. The sheet material container according to claim 1, wherein the filler enclosed portion is in contact with only one of the base material films of two layers between which the attaching layer is attached.

* * * * *